(12) United States Patent
Kharatishvili

(10) Patent No.: US 9,842,031 B1
(45) Date of Patent: Dec. 12, 2017

(54) INCREMENTAL UPDATES TO USER TRANSACTION STATE AT READ-ONLY NODES OF A DISTRIBUTED DATABASE

(71) Applicant: Amazon Technologies, Inc., Reno, NV (US)

(72) Inventor: Tengiz Kharatishvili, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 413 days.

(21) Appl. No.: 14/563,756

(22) Filed: Dec. 8, 2014

(51) Int. Cl.
*G06F 17/30* (2006.01)
*G06F 11/14* (2006.01)

(52) U.S. Cl.
CPC .... *G06F 11/1474* (2013.01); *G06F 17/30575* (2013.01)

(58) Field of Classification Search
CPC .................................................. G06F 17/30575
See application file for complete search history.

(56) References Cited

U.S. PATENT DOCUMENTS

| | | | |
|---|---|---|---|
| 6,356,916 B1 | 3/2002 | Yamatari et al. | |
| 7,571,290 B1 | 8/2009 | Ranade et al. | |
| 7,734,580 B2 | 6/2010 | Lahiri et al. | |
| 8,521,687 B2 | 8/2013 | Colbeck et al. | |
| 8,862,540 B2 | 10/2014 | Mordvinova et al. | |
| 9,507,843 B1 * | 11/2016 | Madhavarapu | G06F 17/30575 |
| 2009/0248765 A1 * | 10/2009 | Akidau | G06F 11/004 |
| 2012/0239722 A1 | 9/2012 | Bolosky et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2014/0279884 A1 * | 9/2014 | Dantkale | G06F 17/30575 707/620 |

* cited by examiner

*Primary Examiner* — Hung Q Pham
(74) *Attorney, Agent, or Firm* — Robert C. Kowert; Meyertons, Hood, Kivlin, Kowert & Goetzel, P.C.

(57) ABSTRACT

A distributed database system may implement incremental updates to user transaction state at read-only nodes of the distributed database. A read-write node of the distributed database may determine a change to transaction state for a user transaction initiated at the read-write node. The read-write node may send a notification of the change to the transaction state for the user transaction to a read-only node in order to incrementally update the transaction state for the user transaction at the read-only node. The read-only node may receive the notification of the change to the transaction state and update in-memory system metadata to apply the change to the transaction state for the user transaction. A view of the distributed database may be made available at the read-only node for read requests according to the updated transaction state for the user transaction.

20 Claims, 9 Drawing Sheets

INCREMENTAL UPDATES TO USER TRANSACTION STATE AT READ-ONLY NODES OF A DISTRIBUTED DATABASE

BACKGROUND

Distributed database systems offer a host of advantages to users. For example, distributed database systems provide opportunities to balance the workload performed among different nodes, systems, or devices, in order to optimize various different functions, such as performing read or write requests. Risk of failure may be dispersed among different nodes so that one or more individual failures may be tolerated in the distributed database system. Additionally, distributed database systems may be scaled more easily than traditional monolithic database systems in order to account for growing computational and other resource demands. In the face of these appealing benefits, various different implementation challenges for distribute database systems must be overcome. Coordination problems between various nodes can, for example, occur, especially when operating on a common set of data.

A read replica model is one example of a distributed database system architecture that is used to scale out read processing. According to a typical read replica model, as changes are made to the structure of the database, a SQL record or other indication of the changes may be created which may then be propagated to all the read-replicas of the database. Each replica would then apply these changes locally on their own versions of the database. However, for read-replicas operating on a common set of data for the database, replicating changes to the data may not be as simple. For example, in-memory data structures used to manage the database may be modified as a result of changes to the database. For read-replicas of the database utilizing a common set of data, these changes to in-memory data structures may also need to be replicated in order to present a view consistent view of the database.

Figure 1:
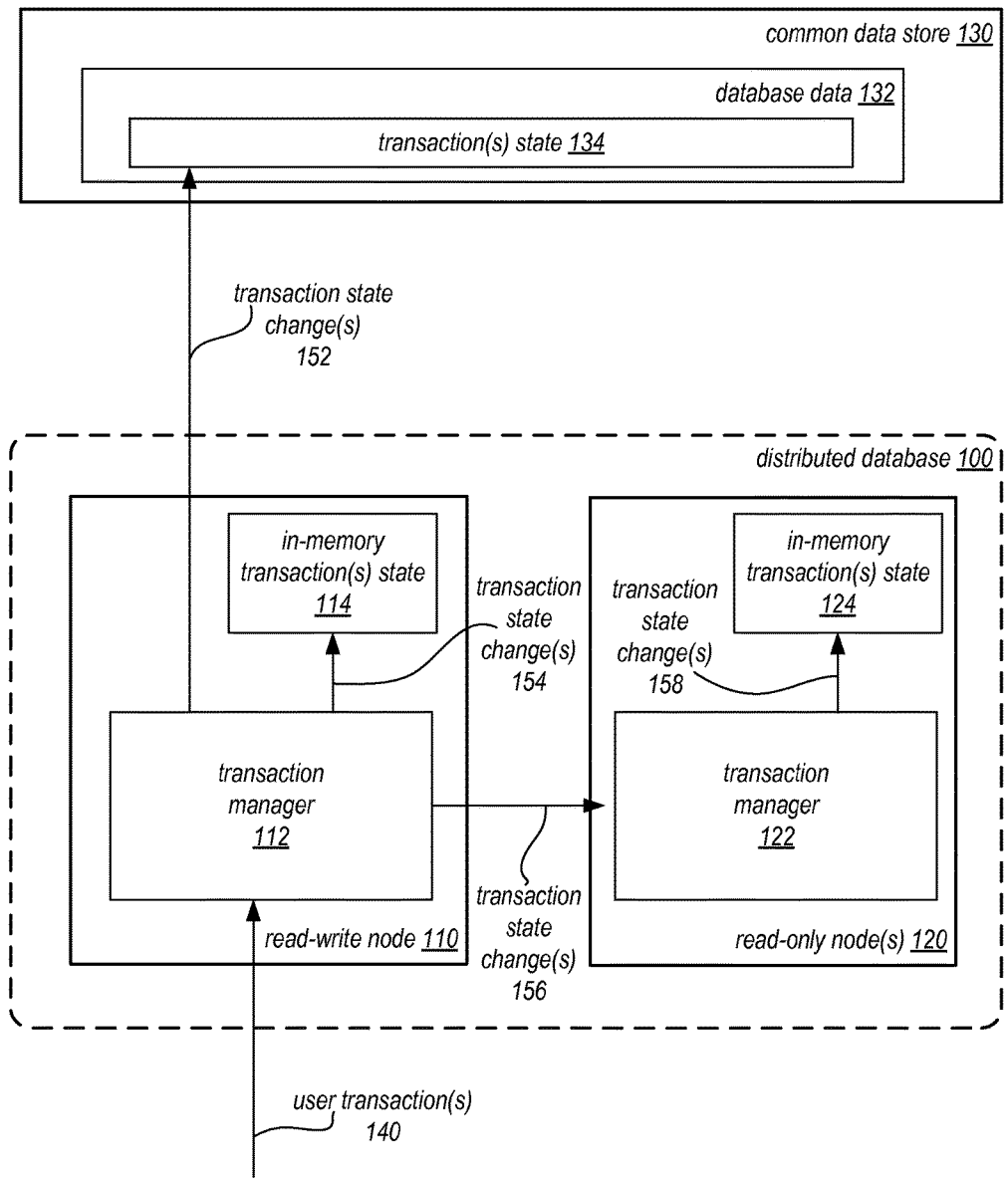
FIG. 1 is a block diagram illustrating incremental updates to user transaction state at read-only nodes of a distributed database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112(f) interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of incremental updates to user transaction state at read-only nodes of a distributed database system are disclosed. Various ones of the present embodiments may include a read-write node (or "leader," "master," or "primary" node) of a database service receiving, from a client of the database service, an update, such as a write request, that specifies a modification to be made to data maintained by the distributed database. The read-write node may then apply the requested update, such as by modifying one or more in-memory data structures (e.g., database cache, database dictionary, transaction list, etc.). In some embodiments, user transactions made up of one or more multiple updates may be initiated at the read-write node. User transactions may have various states, and may complete (and thus be "committed") or may not complete (or only be partially complete) such that that the user transactions be undone or rolled back in order to maintain a consistent state of the distributed database. The user transactions may be maintained in-memory, in various embodiments, as part of the in-memory data structures at the read-write node.

In at least some embodiments, the read-write node may also generate one or more change notifications, such as redo log records, cache invalidation messages, or update internal memory data messages, corresponding to the changes made as part of a system transaction. In at least some embodiments, these change notifications may indicate changes to transaction state for user transactions initiated at the read-write node. These change notifications may be sent to one or more read-only nodes (sometimes referred to as "read-replicas"). Read-only nodes may utilize the change notifications to provide a view of the database to service read requests. In at least some embodiments, read-only nodes may implement transaction management to provide consistent views of the transaction data. The notifications of changes to transaction state for user transactions initiated at the read-write node may allow a read-only node to incrementally update in-memory system metadata maintaining transaction state information for the read-only to apply the changes to the transaction state for user transactions.

In various embodiments, a common data store may be implemented to maintain data for a distributed database that is accessible to both read-write nodes and read-only nodes. In this way, changes to the database are maintained at one canonical source (even if the common data store itself provides multiple copies of the data for durability and availability) so that read-only nodes may service read-queries for data utilizing the same data store as a read-write node making changes. Included in the data maintained for the distributed database in the common data store, is user data and system data for the distributed database, including the transaction history of state changes to user transactions, along with various other system metadata to manage the distributed database (e.g., mapping information, data dictionaries, allocation information, etc.).

Allowing different configurations of database components in order to optimize various operations performed is one advantage of distributed database systems. Read-only nodes (or read replicas), for instance, may allow a distributed database system to more efficiently respond to read queries by operating as a replica of the database managed at a read-write node, which may provide better service for applications with read-heavy database workloads. However, replicating updates made at a read-write node (or other component responsible for processing updates to the distributed database, such as a leader node or master node) may prove difficult. User transactions, for instance, may require management in order to provide consistent views of the distributed database at read-only nodes, when the user transactions are performed at read-write nodes. FIG. 1 is a block diagram illustrating incremental updates to user transaction state at read-only nodes of a distributed database, according to some embodiments.

Distributed database 100 may be a database system that maintains data for one or more clients, applications, or systems that utilize distributed database 100. A database table, for instance, or various other schemas (e.g., relational database), structures, or objects may be employed to organize data maintained by distributed database 100. Distributed database 100 may be configured to process any number of updates, requests, operations, or transactions with regard to storing and maintaining data for the database. Various different hardware and software components, such as servers or computing systems (e.g., computing system 1000 described below with regard to FIG. 9) may be used to implement different components within distributed database 100. Virtual nodes or instances may be implemented, for example, that function independently, even though they may be implemented on the same component or a lesser number of physical hardware components than the number of nodes.

As illustrated in FIG. 1, a read-write node 110 may be implemented as part of distributed database 100. Read-write node 110 may be configured to receive read or write requests from clients, systems, or other components/devices external to distributed database 100. A write request, for example, may be received at read-write node 110 that requests a value of a particular record maintained by distributed database 100 be modified to a new value. Read-write node 110 may also be configured to process read requests, such as the request for one or more records, data values, or other portions of data maintained by distributed database 100. In at least some embodiments, read-write node 110 may be configured to process database updates or requests for the database, while other components, such as read-only nodes 120, may be configured to perform other operations.

In FIG. 1, read-only nodes 120 may process and respond to read requests, such as by providing a requested one or more records, data values, or other portions of data maintained by distributed database 100. The read requests processed by read-only nodes 120 may request data that is currently being, or recently been updated by operations performed by read-write node 110. Read-only nodes 120 may, therefore, operate as a replica of a consistent state of distributed database 100 in order to prevent returning data in a response to a read request that is not consistent with data storage or other devices persisting data for distributed database 100.

Common data store 130 may be one or more storage nodes, systems or devices configured to persistently maintain database data 132 for distributed database 100. Database data 132 may include user data, such as the various tables or records managed, searched, analyzed, and/or updated by a user of distributed database 100, as well as the system data for distributed database to operate upon the user data (e.g., data dictionaries, allocation tables, or transaction tables/history). As illustrated in FIG. 1, database data 132 may include transaction(s) state 134, which may indicate the transaction state for user transactions initiated at read-write node 110.

User transactions 140 may be initiated at read-write node 110. User transactions 140 may include one or more multiple updates to database data 132, which read-write node 110 may perform. For example, read-write node 110 may send various write requests to common data store 130 to update different portions of database data 132 as part of a user transaction. Over the course of performing a user transaction, read-write node 110 may maintain the state of a user transaction, in order to provide a consistent view of the database data 132, when reading to and/or writing to database data 132. In at least some embodiments, read-write node 110 may implement a transaction manager 112, which may perform various functions to provide transaction management. As the state of a user transaction changes, transaction manager 112 may provide various notifications of the change. Transaction manager 110 may update 154 in-memory transaction(s) state 114 maintained at read-write node 110. In-memory transaction(s) state 114 may be maintained in a memory device, such as system memory 1020 in FIG. 9 below. Transaction manager 112 may utilize in-memory transaction(s) state 114 to determine whether various transactions are to be included or excluded from views of distributed database 100 for different access requests (e.g., queries, updates, inserts, etc.). In at least some embodiments, transaction manager 112 may implement the techniques discussed below with regard to FIG. 6, and may send transaction state change(s) 152 to be maintained as part of transaction state(s) 134 in common data store 130. Notifications 156 of the changes to transaction state for user transactions may also be sent to read-only node(s) 120.

Like read-write node 110, read-only node(s) 120 may implement transaction manager 122 to provide transaction management. Transaction manager may apply the changes from notifications 156 to update 158 in-memory transaction(s) state 124. In-memory transaction(s) state 124 may be maintained in a memory device, such as system memory 1020 in FIG. 9 below. Transaction manager 122 may utilize in-memory transaction(s) state 124 to determine whether various transactions are to be included or excluded from views of distributed database 100 for different read requests (e.g., queries) received at read-only node(s) 120. In at least some embodiments, transaction manager 122 may implement the techniques discussed below with regard to FIG. 7.

The specification first describes an example network-based database service that includes the disclosed read-only nodes. Included in the description of the example network-based database service are various aspects of the example network-based database service, such as a database engine, read-only nodes, and a separate distributed database storage service that is accessible to read-only nodes and read-write nodes. The specification then describes flowcharts of various embodiments of methods for incremental updates to user transaction state at read-only nodes of a distributed database. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single primary node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because redo logs and not modified data pages are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time. Moreover, communications (e.g., a change notification, such as a change to transaction state for a user transaction) sent from a read-write node of the database tier to read-only nodes of the database tier may be asynchronous as well.

As previously noted, in typical large database systems, the entire data set needs to be restored before the database system can be restarted following a failure in the system. In these database systems, following a crash, the system must determine the last point at which it was known that all of the data pages had been flushed to disk (e.g., a checkpoint) and must replay any change logs from that point forward. For example, before the database can be made available to handle incoming queries from client processes, a system process must read in all of the data pages that were changed after the determined checkpoint and apply each of the applicable change log records that had not already been applied to those data pages.

In some embodiments, the database systems described herein may be able to restart the database engine following a failure (e.g., to make the database available to accept and service queries) almost immediately after a database crash, without having to wait for the entire data set to be restored. Instead, queries can be received and serviced while crash recovery is performed lazily by one or more background threads. For example, following a crash, multiple background threads may operate in parallel on different storage nodes to reconstruct data pages from corresponding redo logs. In the meantime, if an incoming query targets a data page that has not yet been reconstructed, the storage layer may be configured to re-create that data page on the fly from the appropriate redo logs.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

Note that the storage service illustrated and described in FIGS. 2-5 is simply an example. Other storage services that are coupled to the database engine and read-only nodes may also be used in various embodiments.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the aforementioned layers), and then adding glue logic to stitch them together. In some embodiments, the systems described herein may instead offload the functionality of the durability and space management layer from the database tier to a separate storage layer, and may distribute that functionality across multiple storage nodes in the storage layer.

In some embodiments, the database systems described herein may retain much of the structure of the upper half of the database instance discussed in the example above, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a read-write node server, which may also be referred to herein as a read-write node (although also referred to as a database engine head node), that receives read and/or write requests from various client programs (e.g., applications) and/or subscribers (users), then parses them and develops an execution plan to carry out the associated database operation(s). For example, the read-write node may develop the series of steps necessary to obtain results for complex queries and joins. In some embodiments, the read-write node may manage communications between the database tier of the database system and clients/subscribers, as well as communications between the database tier and a separate distributed storage system.

In some embodiments, the read-write node may be responsible for receiving SQL requests from end clients through a JDBC or ODBC interface and for performing SQL processing and transaction management (which may include locking) locally. However, rather than generating data pages locally, the read-write node (or various components thereof) may generate redo log records and may ship them to the appropriate nodes of a separate distributed storage system. In some embodiments, a client-side driver for the distributed storage system may be hosted on the read-write node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the read-write node). For example, in embodiments in which data is made durable through the use of protection groups, the read-write node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments.

In some embodiments, the database tier may support the use of synchronous or asynchronous read-only nodes (sometimes referred to as read-replicas) in the system, e.g., read-only copies of data on different nodes of the database tier to which read requests can be routed. In such embodiments, if the read-write node for a given database table receives a read request directed to a particular data page, it may route the request to any one (or a particular one) of these read-only copies. Or, in some embodiments, a client read request may be received directly by a read-only node (from a client), without first going through the read-write node. In some embodiments, the client-side driver in the read-write node may be configured to notify these other read-only nodes (e.g., to a client-side driver of those other nodes) about changes by sending change notifications (e.g., changes to system metadata, such as a data dictionary or active transactions list, and or updates and/or invalidations to data pages, such as those data pages cached locally at the read-only node). In response, the read-only node may be configured to perform the notified changes (e.g., such as by invalidating their caches for a specific page or record of the cache or the whole cache, by modifying internal data structures, and/or by updating or modifying values stored within data pages in the database cache maintained at the read-only node).

For reads requests, the read-only nodes may be configured to determine a consistent state of the database to present when servicing a read request, such as based on whether to include changes to the database performed as part of user transactions initiated at a read-write node. The read request may then be serviced according to the determined consistent state of the database to be presented. In another example, in some embodiments, data pages in a database cache on the read-only node may have been invalidated, and the consistent state of the database to be presented may cause the read-only node to retrieve updated copies of updated data pages (or log records of changes to those pages to apply them to the cache) from the storage layer. In some embodiments, the read-only nodes may be configured to receive an indication (e.g., a manifest) of data pages stored in the cache of the database engine head node, which may include pages that are hot on the read and write side. The read-only nodes may be configured to retrieve the hot pages from the storage layer, which may help prepare a read-only node to convert to a read-write node (e.g., if the read-write node fails). In addition, the read-only node may be configured to update an in-memory data structure (e.g., a transaction table) to determine which redo and undo records were inflight (e.g., not received or known by the read-only node) at the time of the read-write node failure. As a result, the converted read-only node may already have a warm cache (e.g., the cache may not have to be rebuilt from scratch) as part of the conversion process.

In some embodiments, the client-side driver(s) running on the read-write node and/or the read-only nodes may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver(s) (of the read-write node and/or read-only nodes) may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the read-write node cache and/or the by the cache of a particular read-only node. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. For example, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
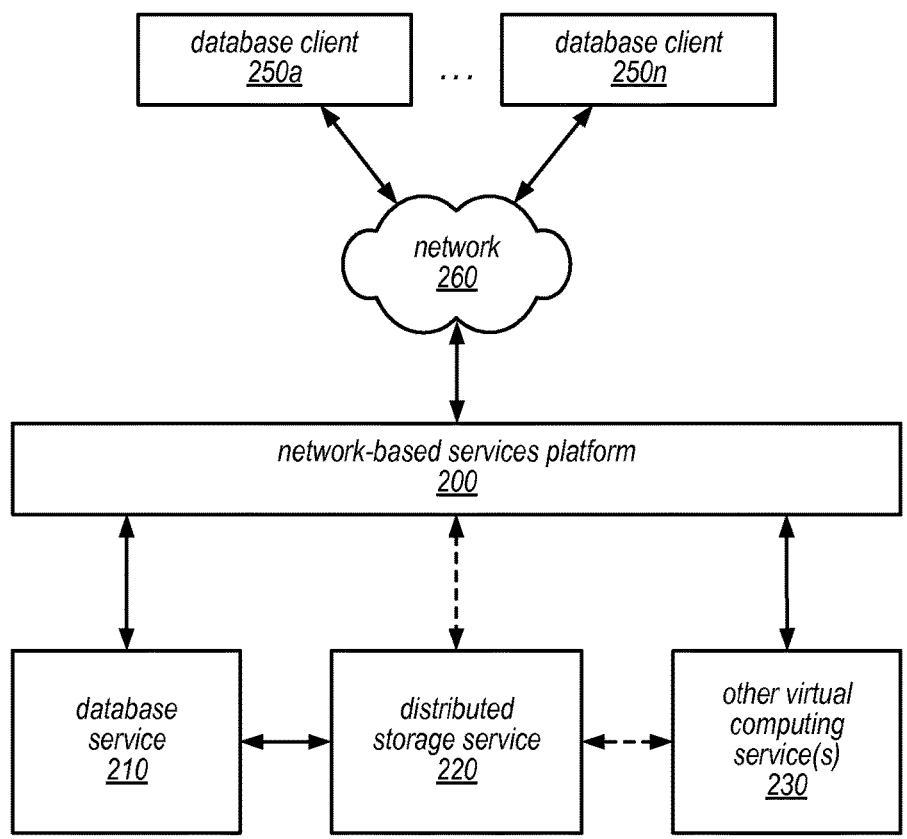
FIG. 2 is a block diagram illustrating a service system architecture that may be configured to implement a network-based database service that implements read-only nodes, according to some embodiments.

One embodiment of a service system architecture that may be configured to implement a network-based database service is illustrated in FIG. 2. In the illustrated embodiment, a number of clients (shown as database clients 250a-250n) may be configured to interact with a network-based services platform 200 via a network 260. Network-based services platform 200 may be configured to interface with one or more instances of a database service 210 (an instance may include a read-write node and a number of read-only nodes), a distributed storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services. For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with web services platform 200. In some embodiments, client 250 may be configured to generate network-based services requests according to a Representational State Transfer (REST)-style web services architecture, a document- or message-based network-based services architecture, or another suitable network-based services architecture.

In some embodiments, a client 250 (e.g., a database service client) may be configured to provide access to network-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to network-based services platform 200 may be coordinated by client 250 and the operating system or file system on behalf of applications executing within the operating system environment.

Clients 250 may convey network-based services requests to and receive responses from network-based services platform 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, network-based service platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Network-based services platform 200 may also implement financial accounting and billing systems, or may maintain a database of usage data that may be queried and processed by external systems for reporting and billing of client usage activity. In certain embodiments, network-based services platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database table, network-based services platform 200 may be configured to ascertain whether the client 250 associated with the request is authorized to access the particular database table. Network-based services platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing database tables on behalf of clients 250 may be transparent to those clients. In other embodiments, distributed storage service 220 may be exposed to clients 250 through network-based services platform 200 to provide storage of database tables or other information for applications other than those that rely on database service 210 for database management. This is illustrated in FIG. 2 by the dashed line between web services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
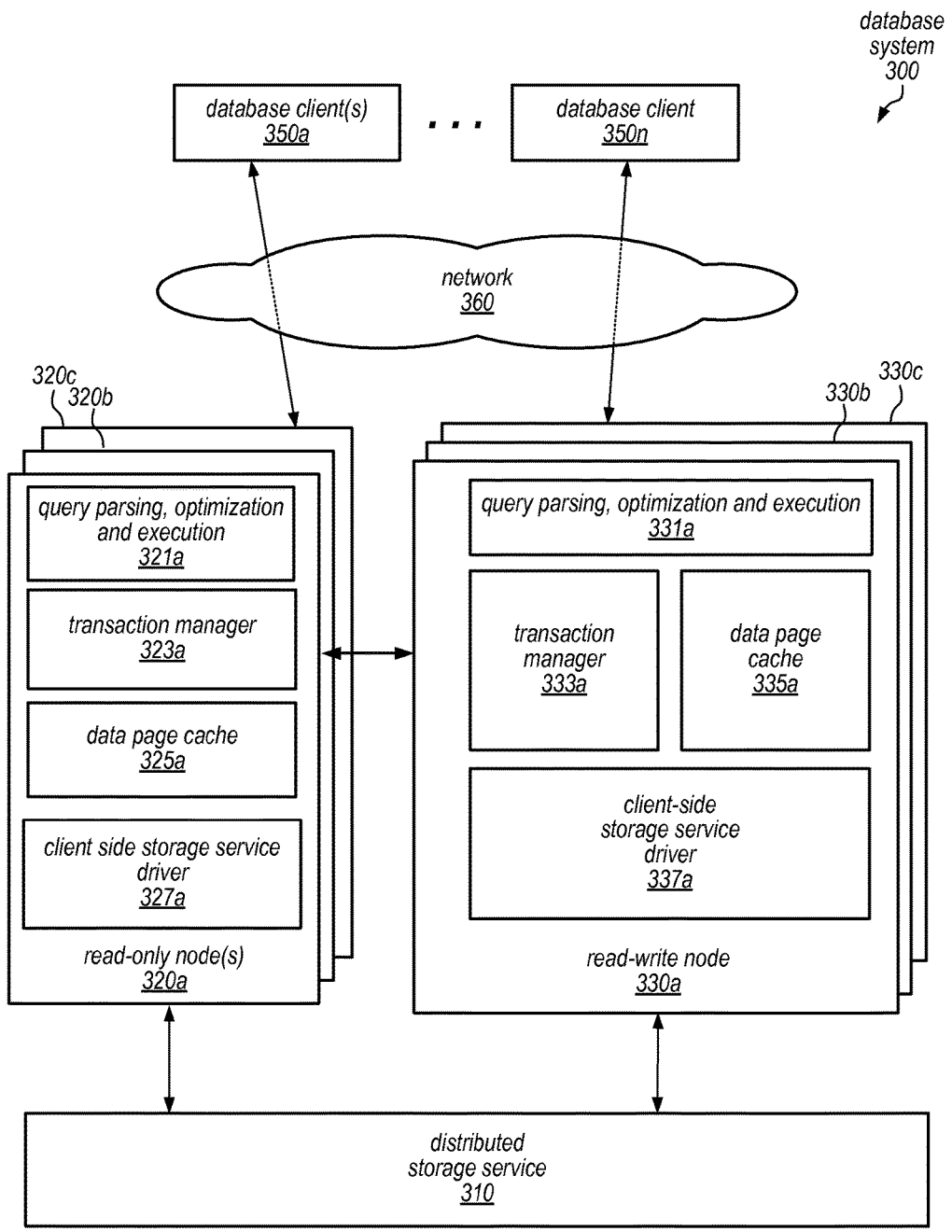
FIG. 3 is a block diagram illustrating various components of a database system configured to use the disclosed read-only nodes, according to some embodiments.

FIG. 3 is a block diagram illustrating various components of a database system that includes a read-write node, read-only nodes, and a separate distributed database storage service, according to one embodiment. In this example, database system 300 includes read-write node(s) 330a, 330b, and 330c and read-only nodes 320a, 320b, and 320c for each of several database tables and a distributed storage service 310 (which may or may not be visible to the clients of the database system, shown as database clients 350a-350n). As illustrated in this example, database clients 350a-350n may access a read-write node 330 (e.g., read-write node 330a, read-write node 330b, or read-write node 330c, each of which is a component of a respective database instance) and/or a read-only node (e.g., read-only node 320a, 320b, or 320c) via network 360 (e.g., these components may be network-addressable and accessible to the database clients 350a-350n). Note that any number of read-only nodes may be associated with a particular database instance but for ease of illustration and explanation, three read-only nodes are shown in FIG. 3. Distributed storage service 310, which may be employed by the database system to store data pages of one or more database tables (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, and/or space management operations in a manner that is invisible to storage clients 350a-350n.

In some embodiments, each database instance may include a single read-write node 330 that receives requests from various client programs (e.g., applications) and/or subscribers (users), then parses them, optimizes them, and develops an execution plan to carry out the associated database operation(s). Also as previously noted, each read-only node may receive read requests (e.g., from various client programs, subscribers, and/or from the read-only node), and may similarly parse such requests, optimize them, and develop an execution plan to carry out the read (e.g., SELECT). In the example illustrated in FIG. 3, a query parsing, optimization, and execution component 331a of read-write node 330a may perform these functions for queries that are received from database client 350a and that target the database instance of which read-write node 330a is a component. In some embodiments, query parsing, optimization, and execution component 331a may return query responses to database client 350a, which may include write acknowledgements, requested data pages (or portions thereof), error messages, and or other responses, as appropriate. As illustrated in this example, read-write node 330a may also include a client-side storage service driver 337a, which may route read requests and/or change notifications (e.g., redo log records) to a read-only node and/or various storage nodes within distributed storage service 310, receive write acknowledgements from distributed storage service 310, receive requested data pages from distributed storage service 310, and/or return data pages, error messages, or other responses to query parsing, optimization, and execution component 331a (which may, in turn, return them to database client 350a).

In this example, read-write node 330a includes data page cache 335a, in which data pages that were recently accessed (read and/or write) may be temporarily held. As illustrated in FIG. 3, read-write node 330a may also include transaction manager 333a, which may be responsible for providing transactionality and consistency in the database instance of which read-write node 330a is a component. For example, this component may be responsible for ensuring the Atomicity, Consistency, and Isolation properties of the database instance and the transactions that are directed that the database instance. In various embodiments, transaction manager 33a may perform the various techniques discussed below with regard to FIG. 6. Read-write node may also include a transaction log, which may be maintained at distributed storage service 310 and undo log, which may be employed by transaction manager 333a to track the status of various transactions and roll back any locally cached results of transactions that do not commit. Read-write node 330a may also maintain system metadata, such as one or more in-memory data structures, such as a data dictionary, transaction state information, or any other information for describing the data structure or schema of the database. Other components, such as query parsing, optimization, and execution 331a, transaction manager 333a, and client-side storage service driver 337a, may access in-memory system metadata in order to process queries, generate change notification messages, and/or any other system functions.

Note that each of the other read-write nodes 330 illustrated in FIG. 3 (e.g., 330b and 330c) may include similar components and may perform similar functions for queries received by one or more of database clients 350a-350n and directed to the respective database instances of which it is a component.

In various embodiments, each of the read-only nodes 320a, 320b, and 320c may also include components similar to those of the read-write node and/or may be configured to include such components (e.g., upon conversion of a read-only to a read-write node to replace the old read-write node), such as query parsing, optimization, and execution component 321a, transaction manager 323a, client-side storage service driver 327a, as well as data page cache 325a and in-memory system metadata including in-memory data structures, such as a data dictionary, transaction state information, or any other information for describing the data structure or schema of the database. As Communication between the read-write node and the read-only nodes may be communication between client side driver 337a and client-side storage service driver 327a. Note that data pages stored in the cache of one read-only node may be different than data pages stored in the cache of another read-only node which may also be different than data pages stored in data page cache 335a. Moreover, the actual data stored for a data page in the cache of one read-only node may be different from the actual data stored for the same data page in the cache another read-only node and/or from the actual data for the same data page stored in data page cache 335a. In at least some embodiments, transaction manager 323a may perform the various techniques described below with regard to FIGS. 7 and 8.

In some embodiments, upon sending a redo log (or undo log) to the storage layer, client-side storage service driver 337a may also be configured to send one or more change notifications to client-side driver 327a at read-only node(s) 320. Change notifications may be indicate various updates or changes made at read-write node. For example, inserting a new record in a database table may include many different changes, such as allocating new space in a data page for the new record, updating the indexing structure (e.g., a b-tree) of the database, storing the new data values for the record, and updating system metadata (e.g., the data dictionary) to include information about the new record may each have one or more change notifications to describe the performance of these changes. Different change notification messages may indicate different types of changes that are performed at a read-write node. Change notifications may include invalidation messages, which may indicate one or more data pages that may have modified data values. Change notifications may also include new data values, changes, or pages themselves for modified/updated data pages. Change notifications may also include changes to system metadata, such as data that indicates the definition and/or layout of data in distributed storage service 310 (e.g., data dictionary), or a change to the transaction state of a user transaction that is initiated at read-write node 330.

In various embodiments, one of read-only nodes 320a, 320b, or 320c may be converted into a new read-write node (e.g., if the read-write node 330a fails). To help prepare for such a conversion, one or more of the read-only nodes may be configured to receive, from the read-write node (while still active), an indication of the data pages stored in the read-write node's cache. The indication may be a manifest of data pages that are hot on the read and write side. The read-only nodes may then retrieve versions of those data pages, for example, from distributed storage service 310, and may store those retrieved data pages in cache. The manifest/indication may be sent periodically (e.g., hourly, daily, etc.) or upon certain events (e.g., every read/write, every 10 read/writes, upon some internal read-write node logic indicating potential read-write node failover, etc.). As such, the read-only nodes' caches may be a warmer cache in the event of a conversion to read-write node. In one embodiment, network-based service platform 200 may determine that a read-write node has failed and select which read-only node to convert. In other embodiments, the first read-only node to detect the read-write node's failure may determine that it should convert into a read-write node or the read-only node may vote for which read-only node to convert. In yet another embodiment, a given one of the read-only nodes may be preselected as the first option to convert into a read-write node if the previous read-write node fails. Other ways to determine which read-only node to convert also exist. In some embodiments, no loss of data may occur in the conversion process because the read-only node is connected to the same data storage as written to by the read-write node, and therefore has access to all of its data. Moreover, sending the change notifications between the read-write node and the read-only nodes may, in various embodiments, allow the read-only nodes to provide consistent views of the database with little or no lag time to catch-up to changes already performed at the read-write node. This is in contrast to a system in which the read-only nodes utilize a different data storage that is separate than that written to by the read-write node. In such a system using different data storage, data loss may occur if the replication was performed asynchronously or poor performance may occur if the replication was performed synchronously.

Moreover, there may exist log records (e.g., redo and/or undo) corresponding to transactions that were inflight to the read-only nodes from the previous read-write node that were unknown (e.g., not seen, not received) to the read-only nodes but were received by distributed storage service 310. Therefore, even if the manifest helps keep the read replicas' respective caches somewhat up to date, they may nevertheless still be stale in some respect. Therefore, in one embodiment, the read-only node that is converted into the new read-write node may (before or after conversion) be configured to determine which was the last log record (e.g., as identified by a monotonically increasing identifier, such as a log sequence number (LSN)) that the read-only node was aware of. The read-only node may then be configured to request which data records having corresponding log records later than the last log record have changed and invalidate those in cache. The read-only node may also be configured to request the actual log records and/or the data records to update its own cache so it is no longer invalid/stale. Further, the read-only nodes may be configured to maintain a transaction table of the inflight transactions. The read-only nodes may be configured to request distributed storage service 310 to send the inflight transactions to the read-only nodes and then update in memory structures (e.g., the transaction table) according to the inflight transactions. Alternatively, as noted above, change notifications may include changes to system metadata which indicate the change to transaction state to be applied to the in-memory system metadata maintaining the transaction state information. The converted read-only node may be configured to determine that a particular transaction of the initiated transactions was related to the failure of the read-write node (e.g., caused it to crash) and roll back a change of that transaction (e.g., not apply it to its own cache and/or instruct the storage layer to remove its application at the storage layer).

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database table. Each write operation may be encoded in a User Log Record (ULR), which represents a logical, ordered mutation to the contents of a single user page within the volume. As noted above, a ULR may also be referred to herein as a redo log record. Each ULR may include a unique LSN, or Log Sequence Number, which may be an identifier that uses monotonically increasing values to denote an ordering. For example LSN 1 is earlier than LSN 3, which is earlier than LSN 6. Note that each number in sequence need not be used. For example, LSNs 1, 2, 3, 4, and 6 may exist but not LSN 5 in some embodiments. Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
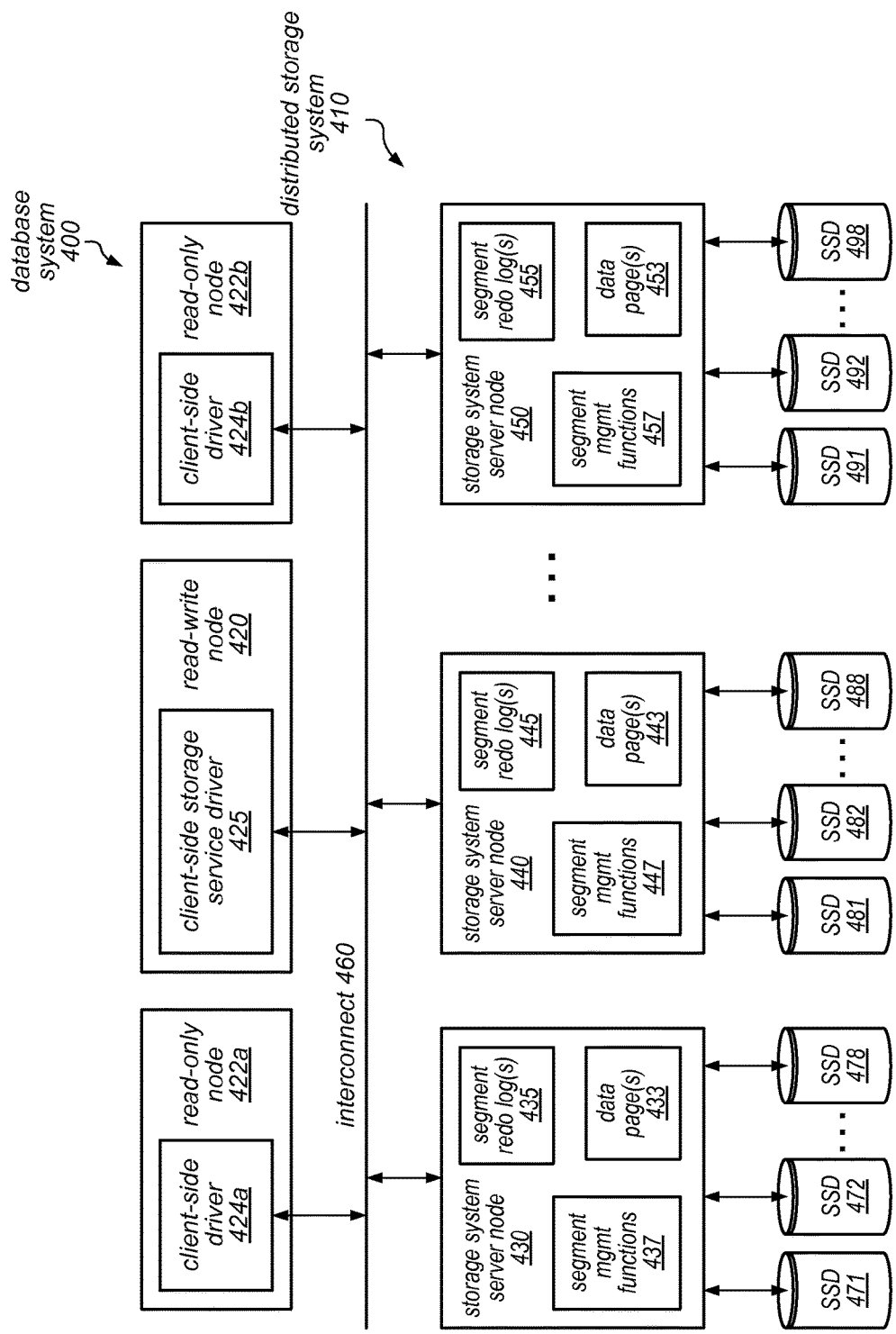
FIG. 4 is a block diagram illustrating a distributed storage system used for the disclosed read-only nodes, according to some embodiments.

One embodiment of a distributed storage system is illustrated by the block diagram in FIG. 4. In this example, a database system 400 includes a distributed storage system 410, which communicates with a read-write node 420, read-only node 422a, and read-only node 422b (only two read-only nodes are shown for ease of illustration/explanation) over interconnect 460. As in the example illustrated in FIG. 3, read-write node 420 may include a client-side storage service driver 425 and read-only nodes 422a and 422b may each include a client-side driver 424a and 424b, respectively. In this example, distributed storage system 410 includes multiple storage system server nodes (including those shown as 430, 440, and 450), each of which includes storage for data pages, redo logs for the segment(s) it stores, system metadata for read-write node 420 (e.g., data dictionary data, transaction table data etc.) and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

Figure 5:
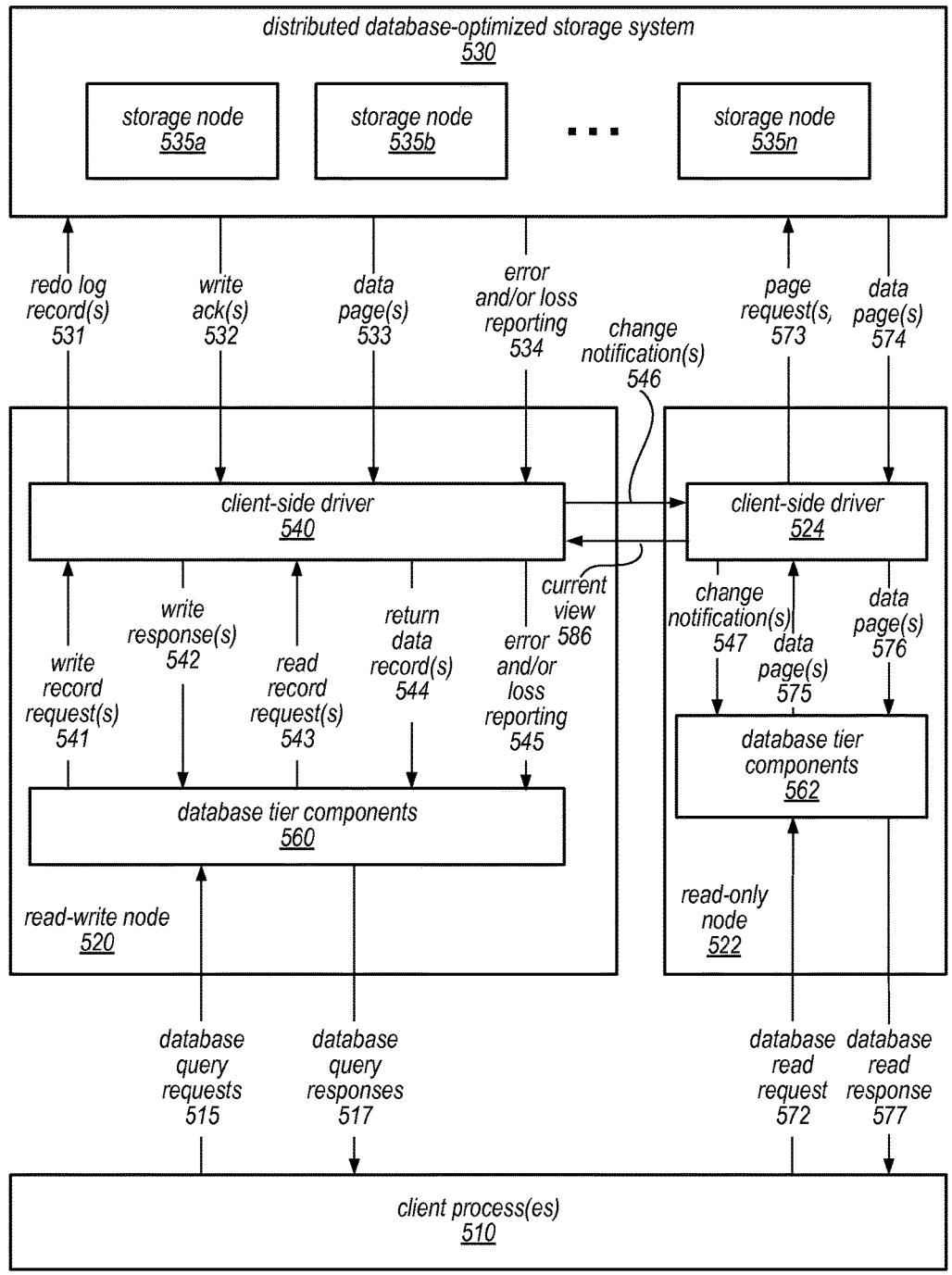
FIG. 5 is a block diagram illustrating the use of a separate distributed storage system in a database system configured to use the disclosed read-only nodes, according to some embodiments.

FIG. 5 is a block diagram illustrating the use of a separate distributed storage system in a database system, according to one embodiment. In this example, one or more client processes 510 may store data to one or more database tables maintained by a database system that includes a database engine 520 and a distributed storage system 530. In the example illustrated in FIG. 5, database engine 520 includes database tier components 560 and client-side driver 540 (which serves as the interface between distributed storage system 530, database tier components 560, and read-only node 522). In some embodiments, database tier components 560 and 562 may perform functions such as those performed by query parsing, optimization and execution component 331a and 321a and transaction and consistency management component 333a and 323a of FIG. 3, and/or may store data pages (such as those stored by data page cache 335a and 325a) transaction logs and/or undo logs.

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. In some embodiments, for write requests, client-side driver 540 may send change notifications 546 (e.g., a notification of changes to data pages, such as the new data values themselves as indicated by the one or more redo log records 531 or cache invalidation messages, and/or changes to transaction state for user transactions initiated at the read-write node 520, such as data structures that indicate the layout and/or definition of the database and/or transaction state, such as the states of and entries of active transactions at read-write node 520) to client-side driver 524 of read-only node 522, which may in turn send the changes 547 to database tier components 562, to apply the changes, such as to a cache and in-memory system metadata. In some embodiments, client-side driver 524 may indicate a current view 586 of the database to read-write node 520 (in order for read-write node to determine which change notifications 546 to send, such as whether to send changes to transaction state that indicate new transactions have been initialized, as discussed below with regard to FIG. 8).

Storage system 530 may return a corresponding write acknowledgement 532 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to clients-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517. Note that certain read and write requests may be made to a cache (e.g., data page cache 335) of database engine, in addition to, or instead of being made to distributed storage system 530. As part of parsed and optimizing certain read requests, some, or all, of the read query plan may be passed to read-only node 522 for performing the read.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, client process(es) 510 may submit database read request 572 directly to read-only node 522 to query the database. For a request for non-stale cached data, database tier components 562 may retrieve the requested data from a cache and return it to client process(es) as database read response 577. For a request for a data record that is present in the cache as stale data or for a data record that is not present in the cache, database tier components 562 may requested data pages 575 from client-side driver 524, which in turn may send may send page request(s) 573 to distributed storage system 530 and the requested data page(s) 574 may be returned to client-side driver 524, which provides the data pages 576 to database tier components 562, which are then provided to client process(es) 510 as database read response 577. In one embodiment, data page(s) 574 may be routed through client-side driver 524 of read-only node 522 and the data page(s) may be stored in the cache and replace the stale cached data or replace some other data that is determined as cold data (e.g., is accessed less frequently than other cached data).

Note that in various embodiments, the API calls and responses between read-write node 520 and distributed storage system 530 (e.g., APIs 531-534) and/or the API calls and responses between client-side driver 540 and database tier components 560 (e.g., APIs 541-545) and/or API calls and responses between read-only node 522 and distributed storage system 530 (e.g., APIs 573-574) and/or API calls and responses between client-side driver 524 and database tier components (575 and 576) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

Figure 6:
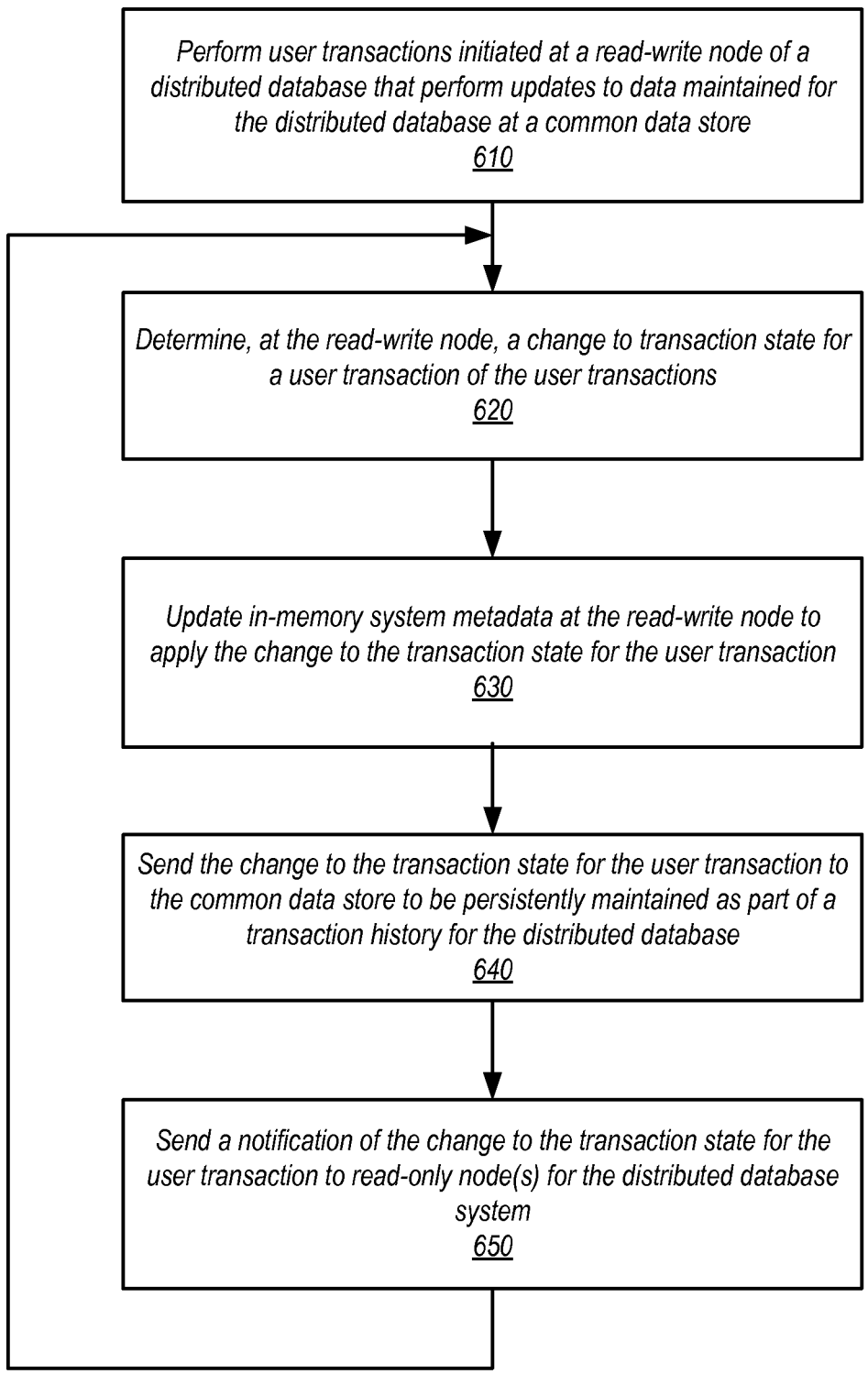
FIG. 6 is a high-level flowchart illustrating a method to send incremental updates to user transaction state from a read-write node to a read-only node in order to incrementally update user transaction state at the read-only node, according to some embodiments.

Various examples have been given above of a distributed database system configured to implement incremental updates to user transaction state for read-only nodes of a distributed database. While the different ones of the various components, modules, devices, nodes, or systems described above may be configured to implement incremental updates, various other different devices may also be configured to implement incremental updates to user transaction state for read-only nodes of a distributed database. FIG. 6 is a high-level flowchart illustrating a method to send incremental updates to user transaction state from a read-write node to a read-only node in order to incrementally update user transaction state at the read-only node, according to some embodiments, which may be implemented by the example distributed database systems described above or other database systems that implement read-only nodes.

As indicated at 610, user transactions initiated at a read-write node of a distributed database may be performed, in various embodiments. The user transactions may include performing updates to data maintained for the distributed database at a common data store. The common data store, such as the distributed storage service discussed above with regard to FIGS. 2-5, may also serve as the data source for read-only nodes to service read requests. Thus, the common data store may be accessible to the read-write node and read-only nodes for the distributed database.

As indicated at 620, a change to transaction state for a user transaction of the user transactions initiated at the read-write node may be determined, in various embodiments. For example, the various updates to data maintained in the common data store may be successfully performed, modifying different data records in the database. Once the read-write node determines that the actions of the transaction are made durable to the common data store (e.g., an acknowledgment from a write quorum of storage nodes for each of the write requests for all of the updates is received), then the read-write node may determine that the transaction state is to be changed to committed (and may acknowledge the transaction as committed to the client that requested the transaction). Consider another example where one or more of the updates of user transaction fails or is unable to complete (e.g., due to deadlock or some other inability to obtain a lock to perform updates). The read-write node may determine that the transaction state for the user transaction is to be changed to rollback so that any completed updates of the user transaction are not included in views of the distributed database for servicing requests. Please note that various other changes to transaction state may be determined (e.g., changes to active state, waiting state, rollback to savepoint, set savepoint, release savepoint, etc.), and thus the previous examples are not intended to be limiting.

As indicated at 630, in response to determining the change to the transaction state, the in-memory system metadata for the read-write node may be updated to apply the change to the transaction state for the user. The location in the system metadata, for instance, may be written to or otherwise changed to reflect the new state. As indicated at 640, the change to the transaction state for the user transaction may be sent to the common data store to be persistently maintained as part of a transaction history for the distributed database. In at least some embodiments, the common data store may be implemented as a log-structured data store, such as the distributed storage system discussed above with regard to FIGS. 2-5. The change to the transaction may be stored and/or maintained according to a sequence for the transaction history as part of the log maintained in the log structure data store, such as discussed below with regard to FIG. 8. However, in at least some embodiments, some types of changes to the transaction state (e.g., commit, rollback, or rollback to save point) may not be stored and/or maintained according to a sequence for the transaction history. Instead, these changes may be stored in such a way as to only indicate that particular data values of a particular data page have been changed (with no indication as to the transaction (e.g., transaction id) or change ascertainable). Thus, some changes to transaction state may be stored in a different layout in the common data store than is maintained at in-memory system metadata at a read-write node or read-only node. As result of the different storage layout, obtaining the changes to the transaction state from the common data store may be a significantly more costly operation in terms of time and computational resources than sending a notification of the change to a read-only node to be applied, as described at element 650 and FIG. 7 below.

As indicated at 650, a notification of the change to the transaction state for the user transaction may be sent to read-only node(s) that are currently operating and/or initializing for operation for the distribute database system, in various embodiments. The notification of the change may include a transaction identifier and/or other information necessary to locate the user transaction in the in-memory system metadata. The indication of the change may also include the change to the state of the user transaction (e.g., the current state—active, commit, rollback, rollback to save point, waiting, etc.). As illustrated by the arrow looping back from element 650 to before 620, the read-write node may continually determine new state changes for the same or different user transactions. In at least some embodiments, the technique of FIGS. 6 and 7 may be implemented to provide notifications of new user transactions initiated at the read-write node in addition to or as an alternative to the techniques described below with regard to FIG. 8.

Figure 7:
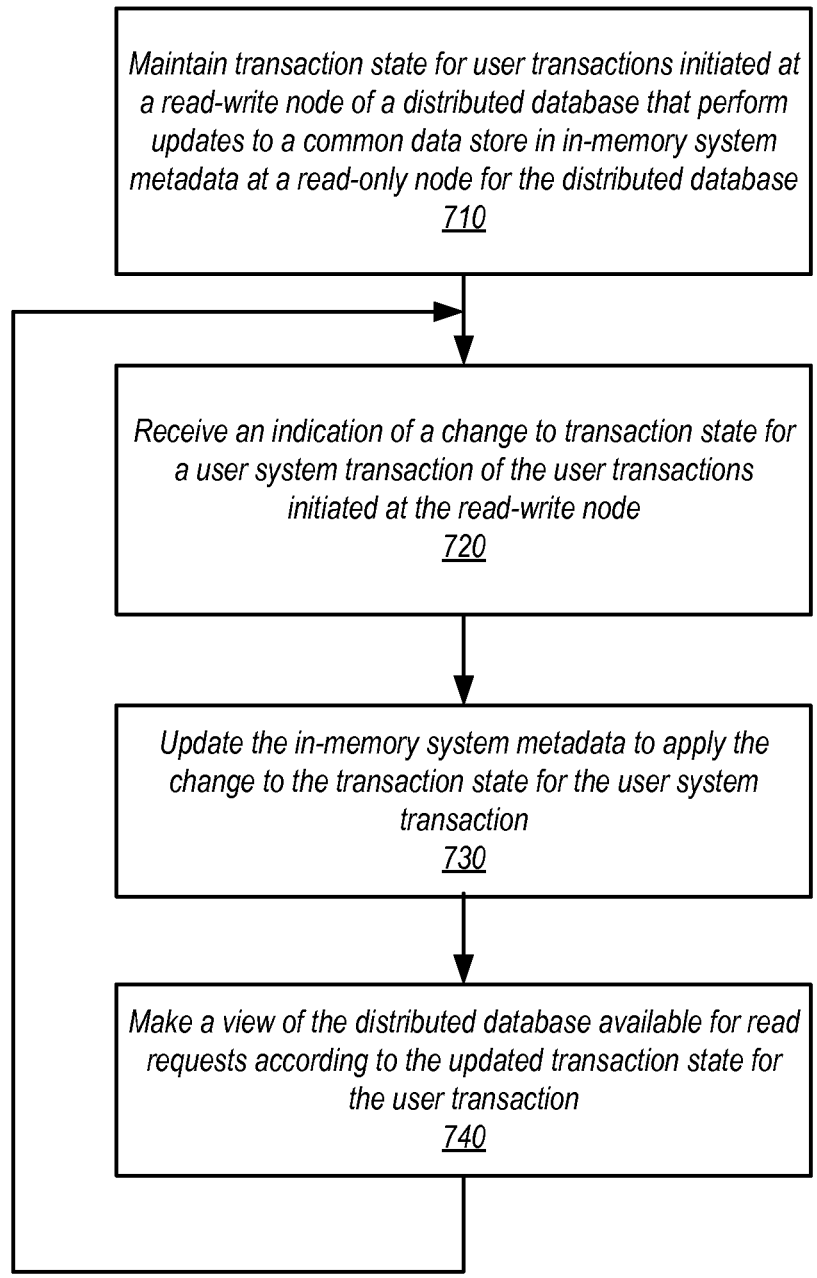
FIG. 7 is a high-level flowchart illustrating a method of receiving incremental updates to user transaction state at a read-only node from a read-write node in order to incrementally update user transactions state at the read-only node, according to some embodiments.

FIG. 7 is a high-level flowchart illustrating a method of receiving incremental updates to user transaction state at a read-only node from a read-write node in order to incrementally update user transactions state at the read-only node, according to some embodiments. As indicated at 710, transaction state for user transactions initiated at a read-write node of a distributed database that perform updates to a common data store may be maintained in in-memory system metadata at a read-only, in various embodiments. As with the read-write node above, the read-only node may provide transaction management for user transactions performed at the distributed database in such a way so that read requests received at the read-only node may be serviced according to a view of the distributed database that is consistent. Moreover, the read-only node may maintain consistency with the read-write node, ensuring that updates performed as part of a user transaction are not made visible for a read-request until after the user transaction is committed at the read-write node.

As indicated at 720, an indication of a change to transaction state for a system transaction of the user transactions initiated at the read-write node may be received. The indication may include a transaction identifier and/or other information necessary to locate the user transaction in the in-memory system metadata. The indication of the change may also include the change to the state of the user transaction (e.g., the current state—active, commit, rollback, rollback to save point, waiting, etc.). As indicated at 730, the in-memory system metadata may be updated to apply the change to the transaction state for the system transaction, in various embodiments. The location in the system metadata, for instance, may be written to or otherwise changed to reflect the new state.

As indicated at 740, a view of the distributed database may be made available for read requests according to the updated transaction state for the user transaction, in various embodiments. For example, if the transaction state is changed to committed, then the updates performed to the data in the common data store as part of the user transaction may be included in the view of the distributed database made available for servicing read requests at the read-only node, in some embodiments. In another example, if the transaction state is changed to rollback, then the updates performed to the data in the common data store as part of the user transaction may not be included in the view of the distributed database made available for servicing read requests at the read-only node, in some embodiments. The read-only node may continue to receive indications of changes to the transaction state for user transactions, as indicated by the arrow from element 740 to element 720, incrementally updating the transaction state for user transactions without accessing transaction history maintained at the common data store. Over time, new user transactions may be added to the in-memory system metadata, either by obtaining the new user transactions from the common data store or receiving a change notification, such as discussed below with regard to FIG. 8.

Figure 8:
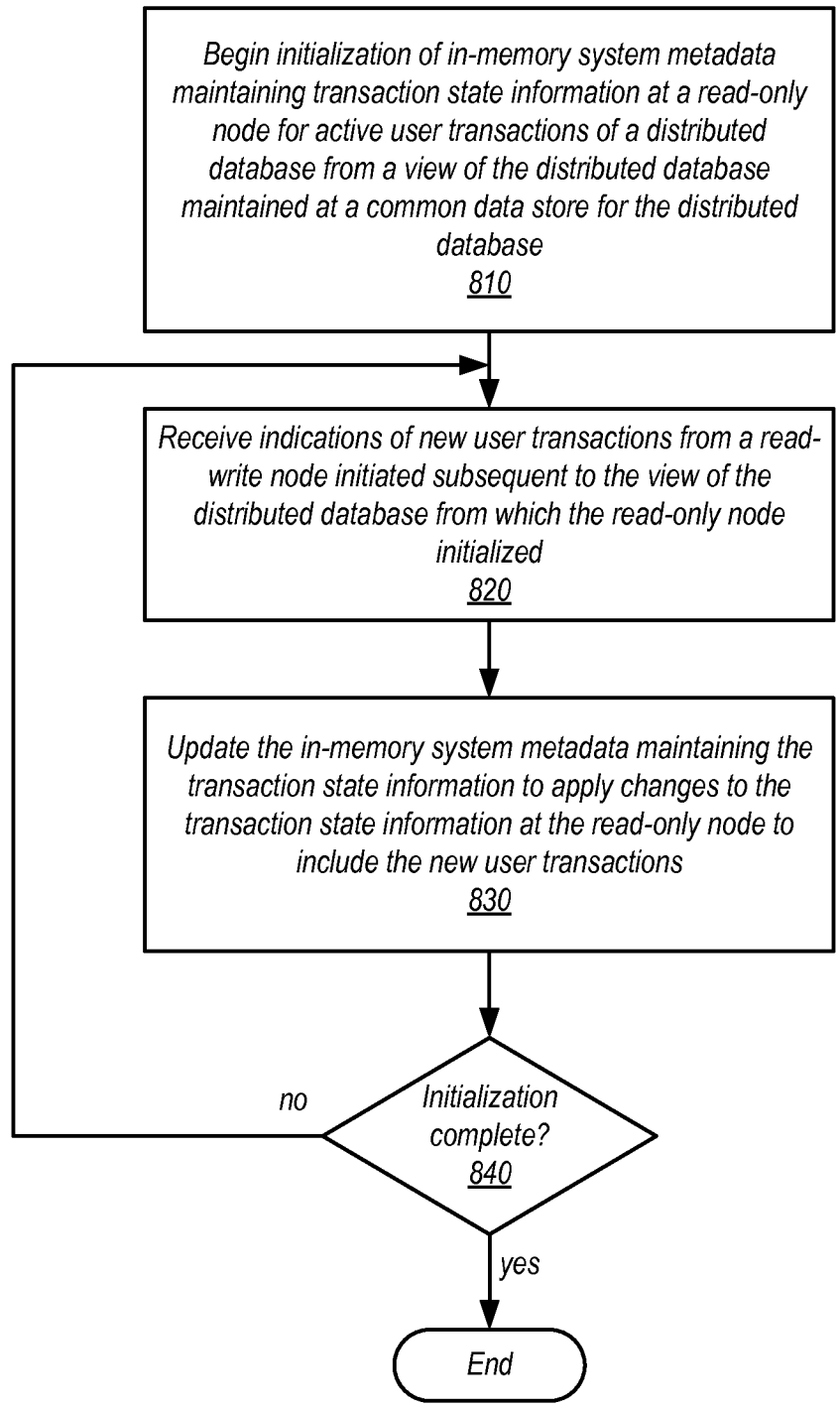
FIG. 8 is a high-level flowchart illustrating a method of receiving indications of new user transactions to be added to user transaction state maintained at a read-only node from a read-write node upon initialization of the read-only node, according to some embodiments.

Notifications of changes to transaction state for user transactions at read-only nodes may only be provided for certain transaction state changes, in various embodiments. For example, some changes may be efficiently obtainable from a common data store that maintains transaction history for a distributed database. Consider the scenario where notifications of new transactions initiated at a read-write node are stored in the transaction history at a common data store for the distributed database. These notifications may be sequentially stored as part of log (or other ordering or sequencing scheme). A read-only node may be able to efficiently evaluate the transaction history according to the stored sequence (e.g., starting at the most recent notification) to quickly identify the new transactions initiated at the read-write node. However, even changes that may generally be efficiently obtained from the common data store, can sometimes be provided directly to a read-only node from a read write node. FIG. 8 is a high-level flowchart illustrating a method of receiving indications of new user transactions to be added to user transaction state maintained at a read-only node from a read-write node upon initialization of the read-only node, according to some embodiments.

As indicated at 810, in-memory system metadata maintaining transaction state information for a read-only node may be initialized for active user transactions of a distributed database from a view of the distributed database maintained at a common data store for the distributed database, in various embodiments. The view of the distributed database may be at a fixed point in time (such as a database snapshot discussed above with regard to FIGS. 2-5), though a read-write node may continue to perform updates to the distributed database, which may alter the distributed database from the view upon which the read-only node initialized as the common data store serves as the persistent storage of the distributed database for both the read-write node and read-only nodes. Thus, the active user transactions determined as part of initializing transactions state information for the may not be current as a result of ongoing processing at the read-write node.

In order to keep the read-only node aware of changes to the transaction state information, the read-write node may send notifications of changes to transaction state for user transactions initialized at the read-write node during the initialization of the read-only node, which may receive and update the transaction state information accordingly, as discussed above with regard to FIGS. 6 and 7. In at least some embodiments, these change notifications may include indications of new user transactions initiated at the read-write node, which the view of the distributed database used to initialize the transaction state information in the in-memory system metadata may not include. Thus, as indicated at 820, indications of new user transactions may be received from a read-write node that were initiated subsequent to the view of the distributed database from which the read-only node initialized (or is initializing), in some embodiments. As with other indications of change to the transaction state, various information about the user transaction may be included along with the transaction state identifying the new transaction state (e.g., as not started, active, waiting, etc.), such as a transaction identifier, locks, processes/threads, or any other information to be maintained as part of the transaction state may be included in the in-memory system metadata to perform transaction management.

As indicated at 830, once received, the in-memory system metadata maintaining the transaction state information may be updated to apply changes to the in-memory system metadata to include the new transactions, in various embodiments. This technique may be continued until initialization is complete, as indicated by the positive exit from 840. Afterwards, the read-write node may cease sending indications of new transactions, as the read-only node may easily obtain this information from the common data store, as discussed above. Thus, indications of new user transactions are an example of certain types of notifications of changes to user transaction state that may be provided in limited circumstances and/or timeframes.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed database systems described herein). The various methods as illustrated in the figures and described herein represent example embodiments of methods. The order of any method may be changed, and various elements may be added, reordered, combined, omitted, modified, etc.

Figure 9:
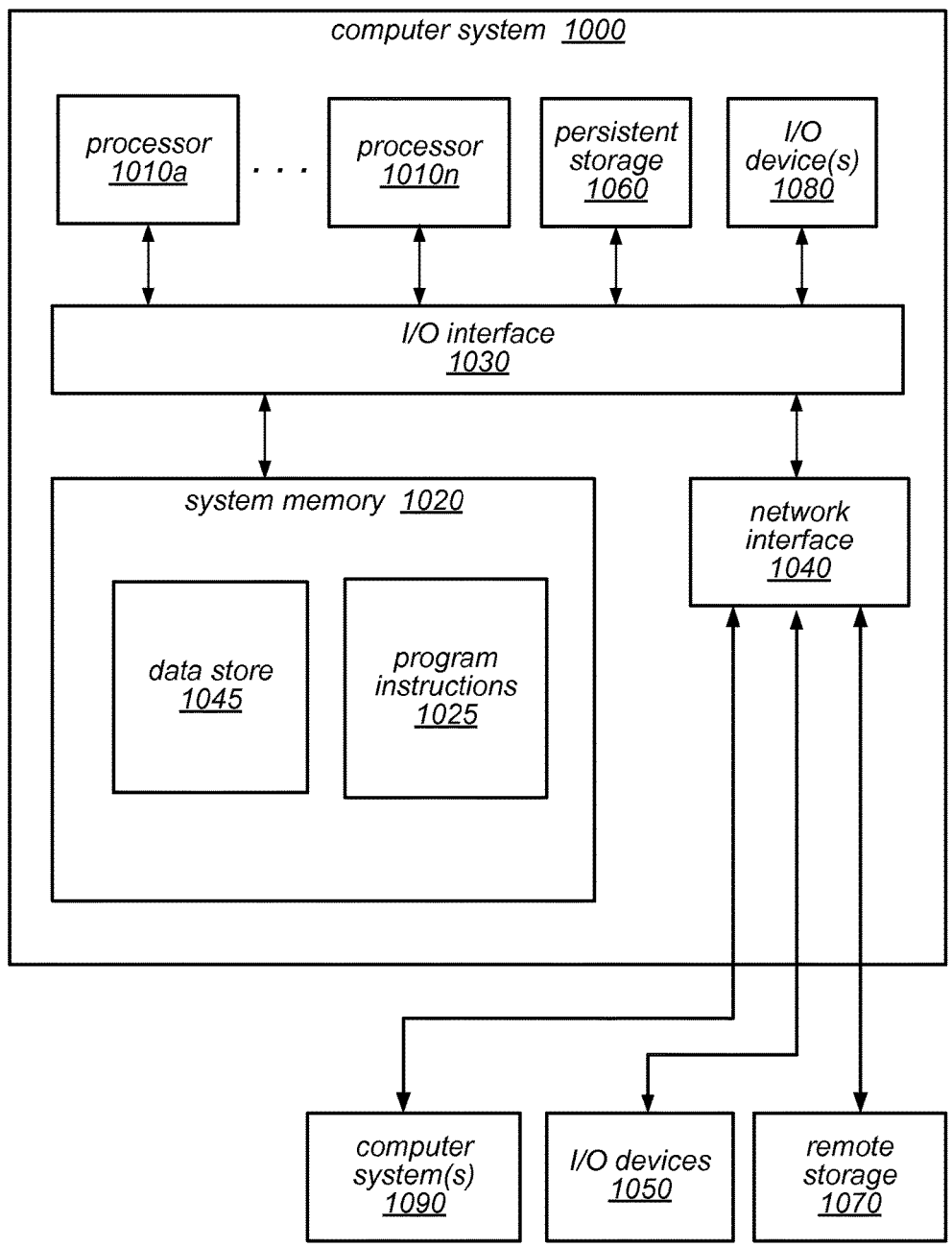
FIG. 9 is a block diagram illustrating an example computer system, according to various embodiments.

FIG. 9 is a block diagram illustrating a computer system configured to implement at least a portion of the database systems described herein, according to various embodiments. For example, computer system 1000 may be configured to implement a read-write (or master/leader/primary) node of a database tier, a read-only node (or read replica), or one of a plurality of storage nodes of a separate distributed storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a read-write node of a database tier, one of a plurality of read-only nodes, or one of a plurality of storage nodes of a separate distributed storage system that stores database tables and associated metadata on behalf of clients of the database tier, in various embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a plurality of database nodes that implement a distributed database;
    a common data store that persistently maintains data for the distributed database that is accessible to the plurality of database nodes;
    a read-only node of the plurality of database nodes, configured to:
        maintain in-memory system metadata that describes transaction state for a user transaction initiated at a read-write node of the plurality of database nodes;
        receive an indication of a change to the transaction state for the user transaction from the read-write node, wherein the initiated user transaction performs one or more updates to the data persistently maintained for the distributed database at the common data store;
        in response to the receipt of the indication of the change to the transaction state for the user transaction:
            update in-memory system metadata to apply the change to the transaction state for the user transaction in the in-memory system metadata; and
            make a view of the distributed database available for read requests according to the transaction state for the user transaction initiated at the read-write node.

2. The system of claim 1, further comprising:
    the read-write node, configured to:
        determine the change to the transaction state for the user transaction initiated at the read-write node; and
        in response to the determination of the change to the transaction state for the user transaction, send a notification of the change to the transaction state for the user transaction to the at least one read-only node of the plurality of database nodes.

3. The system of claim 1, wherein the change to the transaction state for the user transaction changes the transaction state to committed, and wherein the view of the distributed database available for read requests includes the one or more updates to the data of the user transaction.

4. The system of claim 1, wherein the distributed database and the common data store are respective network-based services implemented as part of a network-based service platform.

5. A method, comprising:
    performing, by one or more computing devices implementing at least one read-only node of a plurality of database nodes, wherein the plurality of database nodes implement a distributed database:
        receiving an indication of a change to transaction state for a user transaction initiated at a read-write node of the plurality of database nodes from the read-write node, wherein the initiated user transaction performs one or more updates to data persistently maintained for the distributed database at a common data store that is accessible to the read-write node and the at least one read-only node;
        in response to receiving the indication of the change to the transaction state for the user transaction:
            updating in-memory system metadata to apply the change to the transaction state for the user transaction in the in-memory system metadata; and
            making a view of the distributed database available for read requests according to the transaction state for the user transaction initiated at the read-write node.

6. The method of claim 5, wherein the change to the transaction state for the user transaction changes the transaction state to committed, and wherein the view of the distributed database available for read requests includes the one or more updates to the data of the user transaction.

7. The method of claim 5, wherein the change to the transaction state for the user transaction changes the transaction state to rollback, and wherein the view of the distributed database available for read requests does not include the one or more updates to the data of the user transaction.

8. The method of claim 5, further comprising:
    initializing the in-memory system metadata at the read-only node from a view of transaction history maintained for the distributed database at the common data store; and
    wherein the receiving the indication of the change to the transaction state and the updating of the in-memory system metadata are performed during the initializing of the in-memory system metadata, wherein the change to the transaction state indicates a new user transaction initiated subsequent to the view of the transaction history from which the read-only node is initializing.

9. The method of claim 5, further comprising:
    performing, by another one or more computing devices implementing the read-write node of the plurality of database nodes:
        determining, at the read-write node, the change to the transaction state for the user transaction initiated at the read-write node; and
        in response to determining the change to transaction state for the user transaction, sending a notification of the change to the transaction state for the user transaction to the at least one read-only node of the plurality of database nodes.

10. The method of claim 9, further comprising:
    performing, by the other one or more computing devices implementing the read-write node of the plurality of database nodes:
        sending the change to the transaction state for the user transaction to the common data store to be maintained as part of a transaction history for the distributed database.

11. The method of claim 10,
    wherein the determining the change to the transaction state for the user transaction and the sending the change to the common data store are performed for another user transaction initiated at the read-write node;
    wherein the method further comprises performing, by the one or more computing devices implementing the read-only node:
        obtaining the change to the transaction state for the other user transaction from the transaction history maintained at the common data store;

updating the in-memory system metadata to apply the change to the transaction state for the other user transaction in the in-memory system metadata.

12. The method of claim 11,
wherein the common data store is a log-structured data store such that the change to the transaction state for the other user transaction is stored according to a sequence for the transaction history; and
wherein obtaining the change to the transaction state for the other user transaction from the transaction history comprises evaluating the transaction history according to the sequence for the transaction history in order to identify the change to the transaction state for the user transaction.

13. The method of claim 5, wherein the distributed database and the common data store are respective network-based services implemented as part of a network-based service platform.

14. A non-transitory, computer-readable storage medium, storing program instructions that when executed by one or more computing devices cause the one or more computing devices to implement:
determining, at a read-write node, a change to transaction state for a user transaction initiated at the read-write node, wherein the read-write node is one of a plurality of database nodes, wherein the plurality of database nodes implement a distributed database, wherein the initiated user transaction performs one or more updates to data persistently maintained for the distributed database at a common data store that is accessible to the plurality of database nodes;
in response to determining the change to transaction state for the user transaction, sending a notification of the change to the transaction state for the user transaction to at least one read-only node of the plurality of database nodes;
receiving, at the at least one read-only node, the notification of the change to the transaction state for the user transaction initiated at the read-write node; and
in response to receiving the indication of the change to the transaction state for the transaction, updating in-memory system metadata to apply the change to the transaction state for the user transaction in the in-memory system metadata.

15. The non-transitory, computer-readable storage medium of claim 14, wherein the change to the transaction state for the user transaction changes the transaction state to committed, and wherein the view of the distributed database available for read requests includes the one or more updates to the data of the user transaction.

16. The non-transitory, computer-readable storage medium of claim 14, wherein the program instructions cause the one or more computing devices to further implement:
sending, from the read-write node, the change to the transaction state for the user transaction to the common data store to be maintained as part of a transaction history for the distributed database.

17. The non-transitory, computer-readable storage medium of claim 16, wherein the change to the transaction state is stored according to a layout as part of the transaction history in the common data store that is different from a layout for in-memory system metadata at the read-only node.

18. The non-transitory, computer-readable storage medium of claim 16,
wherein the determining the change to the transaction state for the user transaction and the sending the change to the common data store are performed for another user transaction initiated at the read-write node, wherein the change to the transaction state for the other user transaction indicates that the other user transaction is a new user transaction;
wherein the program instructions further cause the one or more computing devices to implement:
obtaining the change to the transaction state for the other user transaction from the transaction history maintained at the common data store;
updating the in-memory system metadata to include the new user transaction indicated in the change to the other user transaction in the in-memory system metadata.

19. The non-transitory, computer-readable storage medium of claim 14, wherein the program instructions further cause the one or more computing devices to implement:
in response to receiving the indication of the change to the transaction state for the transaction, making a view of the distributed database available for read requests received at the read-only node according to the updated transaction state for the user transaction initiated at the read-write node.

20. The non-transitory, computer-readable storage medium of claim 14, wherein the distributed database and the common data store are respective network-based services implemented as part of a network-based service platform.

* * * * *